United States Patent [19]

Fisher

[11] Patent Number: 5,121,670
[45] Date of Patent: Jun. 16, 1992

[54] RAM ACCELERATOR

[75] Inventor: Edward B. Fisher, Snyder, N.Y.

[73] Assignee: Veritay Technology, Inc., East Amherst, N.Y.

[21] Appl. No.: 662,913

[22] Filed: Mar. 1, 1991

[51] Int. Cl.⁵ .............................................. F41A 1/04
[52] U.S. Cl. .............................................. 89/7; 89/8
[58] Field of Search ........................................ 89/7, 8

[56] References Cited

U.S. PATENT DOCUMENTS

| | | | |
|---|---|---|---|
| 2,836,063 | 5/1958 | Yoler et al. | 73/147 |
| 3,253,511 | 5/1966 | Zwicky | 89/1.7 |
| 3,998,711 | 12/1976 | Hertzberg et al. | 204/157.15 |
| 4,365,471 | 12/1982 | Adams | 60/39.76 |
| 4,510,748 | 4/1985 | Adams | 60/39.02 |
| 4,658,699 | 4/1987 | Dahm | 89/8 |
| 4,722,261 | 2/1988 | Titus | 89/7 |
| 4,726,279 | 2/1988 | Kepler et al. | 89/8 |
| 4,727,930 | 3/1988 | Bruckner et al. | 165/1 |
| 5,063,826 | 11/1991 | Bulman | 89/8 |

OTHER PUBLICATIONS

A. Hertzberg et al., "The Ram Accelerator: A New Chemical Method for Accelerating Projectiles to Ultrahigh Velocities", Submitted to AIAA Journal, Nov. 1986.
A. Hertzberg et al., "The Ram Accelerator: A New Chemical Method of Achieving Ultrahigh Velocities", 37th Meeting of the Aeroballistic Range Association, Quebec, Canada, Sep. 9-12, 1986.
A. P. Bruckner et al., "High Velocity Modes of the Thermally Choked Ram Accelerator", AIAA/ASME/SAE/ASEE 24th Joint Propulsion Conference, Jul. 11-13, 1988, Boston, Mass.
A. P. Bruckner et al., "Ram Accelerator Direct Launch System for Space Cargo", 38th Congress of the International Astronautical Federation, Oct. 10-17, 1987, Brighton, United Kingdom.
S. Yungster et al., "A Numerical Study of the Ram Accelerator Concept in the Superdetonative Velocity Range", AIAA/ASME/SAE/ASEE 25th Joint Propulsion Conference, Monterey, Calif., Jul. 10-12, 1989.
A. E. Kull et al., "Experimental Studies of Superdetonative Ram Accelerator Modes", AIAA/ASME/SAE/ASEE 25th Joint Propulsion Conference, Monterey, Calif., Jul. 10-12, 1989.
S. Yungster et al., "Numerical Simulation of Shock-Induced Combustion Generated by High-Speed Projectiles in Detonable Gas Mixtures", 27th Aerospace Sciences Meeting, Reno, Nev., Jan. 9-12, 1989.
P. Kaloupis et al., "The Ram Accelerator: A Chemically Driven Mass Launcher", AIAA/ASME/SAE/ASEE 24th Joint Propulsion Conference, Boston, Mass., Jul. 11-13, 1988.
C. Knowlen et al., "Performance Capabilities of the Ram Accelerator", AIAA/SAE/ASME/ASEE 23rd Joint Propulsion Conference, San Diego, Calif., Jun. 29-Jul. 2, 1987.
A. P. Bruckner et al., "Investigation of Gasdynamic (List continued on next page.)

*Primary Examiner*—Stephen C. Bentley
*Attorney, Agent, or Firm*—Michael L. Dunn

[57] ABSTRACT

The invention comprises a method for ram accelerating a projectile which comprises charging a tube, having an inlet end for accepting the projectile and a muzzle end from which the projectile may leave the tube, with a combustible gas mixture at an initial elevated pressure in the absence of combustion, so that the projectile may be accelerated by combustion of the mixture behind the projectile as it passes through the tube from the inlet end to the muzzle end; introducing the projectile into the inlet end; igniting the combustible gas mixture between the projectile and the inlet end; and creating the elevated pressure within the tube by means of a shock wave within the combustible gas mixture to obtain the elevated pressure before the projectile passes through the gas. Desirably, a static elevated gas pressure is created at least just prior to passage of the projectile through the gas.

The invention further includes a ram accelerator for practicing the method of the invention.

8 Claims, 7 Drawing Sheets

CHARGE NOZZEL CONCEPT FOR A STATIONARY SINGLE BARREL SYSTEM

OTHER PUBLICATIONS

Phenomena Associated with the Ram Accelerator Concept", AIAA 19th Fluid Dynamics, Plasma Dynamics and Lasers Conference, Honolulu, Hi., Jun. 8–10, 1987.

A. Hertzberg et al., "The Ram Accelerator and Its Applications: A New Chemical Approach for Reaching Ultrahigh Velocities", Invited Paper, 16th International Symposium on Shock Tubes and Waves, Aachen, WG, Jul. 26–30, 1987.

A. Hertzberg et al., "Ram Accelerator: A New Chemical Method for Accelerating Projectiles to Ultrahigh Velocities", AIAA Journal, vol. 26, No. 2, Feb. 1988, pp. 195–203.

CHARGE NOZZEL CONCEPT FOR A STATIONARY SINGLE BARREL SYSTEM

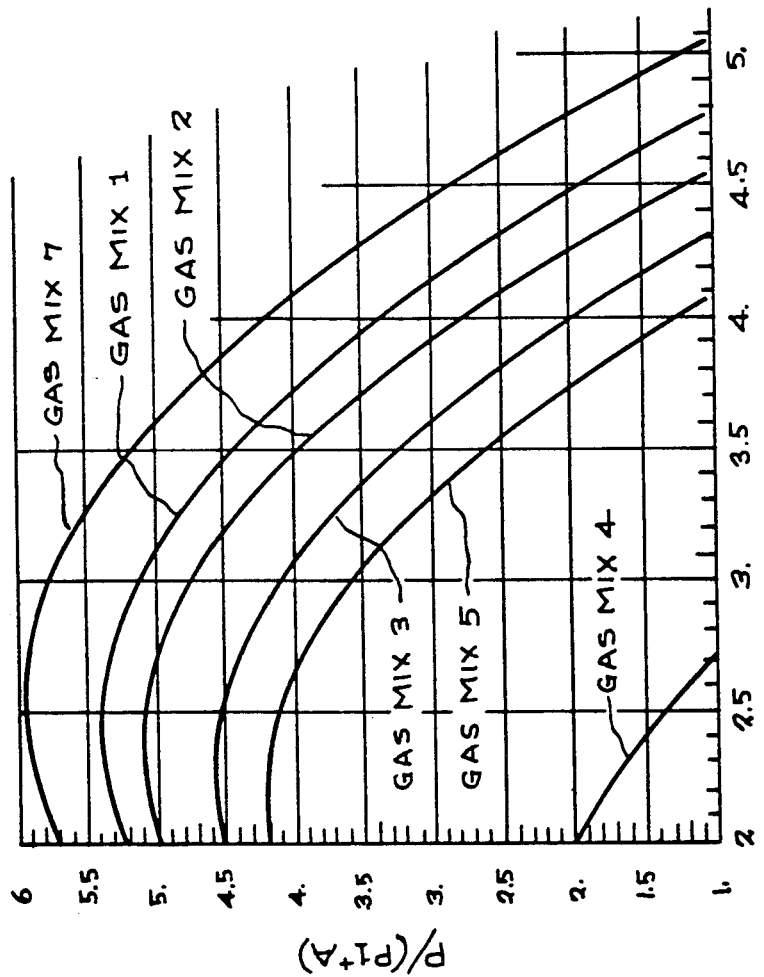

RAM ACCELERATOR

This invention was made under a contract with the United States Air Force, contract number F08635-89-C-0373. The United States Government may have certain rights in this invention.

BACKGROUND OF THE INVENTION

The ram accelerator is a relatively new method for achieving ultra high projectile launch velocities.

The concept was first described as early at 1966 in U.S. Pat. No. 3,253,511 issued to Zwicky, which patent is incorporated herein by reference. As described in the Zwicky patent, a body such as a projectile is located in an elongated tube in which it can slide easily yet fits closely enough to the inner wall to prevent ignition of the propellant ahead of the body. The propellants are introduced into the elongated tube and are ignited or reacted behind the projectile as the projectile passes through the propellants which are distributed along the entire length of the path along which acceleration of the particular body takes place. It may be noted that the body may be any type of projectile, including a vehicle and that alternatively the gases may be ignited within a thrust chamber in the projectile. As used herein, "projectile" is intended in its broad sense and may include bullets or other ordinance or vehicles or payloads which one may wish to accelerate. When combustion behind the projectile is referenced, it is understood that combustion within a combustion chamber within the projectile, but behind the front of the projectile, is included when the projectile is so designed.

Ram accelerators are similarly described in U.S. Pat. Nos. 4,658,699; 4,722,261 and 4,726,279, all of which are similarly incorporated herein by reference.

It has been known that if initial pressure of the combustible gas in a tube used to ram accelerate a projectile, could be elevated prior to ignition, better performance could be obtained due to an initially higher concentration of combustible materials.

Development work performed at the University of Washington at initially elevated combustible gas pressure has successfully achieved projectile velocities in excess of 2.0 kilometers per second when applying the accelerator concept, which is based on ramjet principals, to a projectile with an initial velocity of about 1 kilometer per second. While this work is still in the initial stages, performance estimates indicate that projectile velocities in the range of 5 to 10 kilometers per second or higher may be achieved. Velocities of this magnitude are of extreme interest for SDI and various conventional armament applications that are unique to the three services.

The work at the University of Washington has incorporated an accelerator charged with a combustible gas mixture at a specified pressure. The tube is sealed at both ends with a diaphragm which is ruptured by a projectile as it passes through the tube. This test configuration is useful for technology development testing under laboratory conditions and for potential single-shot applications.

Unfortunately, the use of diaphragms to enable increasing combustible gas pressure in the accelerator tube has significant disadvantages. In particular, the time to replace diaphragms does not permit rapid fire requirement of Gatling gun systems to be utilized. Furthermore, diaphragms, by their nature, do not permit high pressures to be used. If stronger tube closures to obtain higher pressures are used, the impact between the projectile and the closure becomes significant thus slowing or deflecting the projectile or even causing damage to the projectile or the tube. Gate valves can similarly not easily be used to close the exit of muzzle of the tube because such valves under rapid fire conditions are still too slow, would cause significant vibration and timing to prevent destructive contact of the projectile with the gate would be critical.

BRIEF DESCRIPTION OF THE INVENTION

In accordance with the invention, there is therefore provided a method and means for increasing combustible gas pressure within the tube of a ram accelerator without preignition and without requiring diaphragms or large tube closing valves, while permitting rapid repeating ram accelerator operation.

The ram accelerator for a projectile, in accordance with the invention, comprises a tube having an inlet end for accepting the projectile and a muzzle end from which the projectile may leave the tube. The accelerator is provided with a means for charging the tube with a combustible gas mixture at an initial elevated pressure, in the absence of combustion, so that the projectile may be accelerated by combustion of the mixture behind the projectile as it passes through the tube from the inlet end to the muzzle end of the tube. The means for charging includes means for creating the elevated pressure utilizing a means for forming at least one shock wave within the combustible gas mixture to obtain the elevated pressure before the projectile passes through the gas. Desirably, the means for creating the elevated pressure creates a static elevated pressure. "Initial elevated pressure" as used in this context means prior to pressure effects caused by the moving projectile.

The invention further includes a method for ram accelerating a projectile which comprises charging a tube, having an inlet end for accepting the projectile and a muzzle end from which the projectile may leave the tube, with a combustible gas mixture at an initial elevated pressure in the absence of combustion, so that the projectile may be accelerated by combustion of the mixture behind the projectile as it passes through the tube from the inlet end to the muzzle end; introducing the projectile into the inlet end; igniting the combustible gas mixture between the projectile and the inlet end; and creating the elevated pressure within the tube by means of a shock wave within the combustible gas mixture to obtain the elevated pressure before the projectile passes through the gas. Desirably, a static elevated gas pressure is created at least just prior to passage of the projectile through the gas.

BRIEF DESCRIPTION OF THE DRAWINGS

FIGS. 9 and 9A shows a thrust performance curve for various gas mixtures.

DETAILED DESCRIPTION OF THE INVENTION

Figure 1:
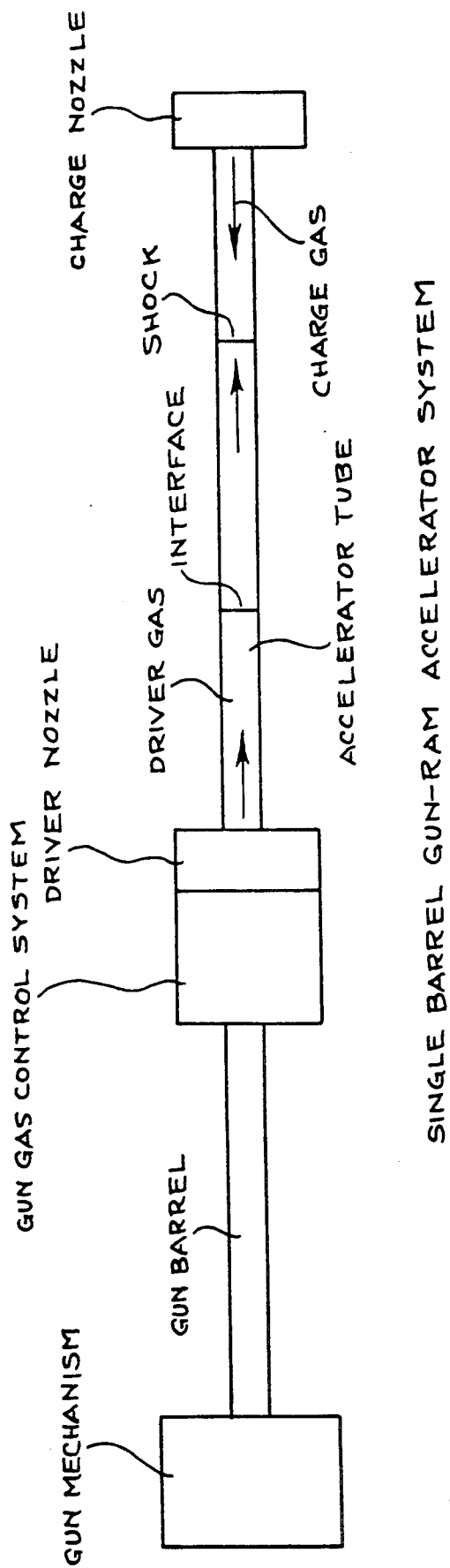
FIG. 1 is a schematic plan view of a single barrel gun ram accelerator in accordance with a preferred embodiment of the invention.
Figure 2A:
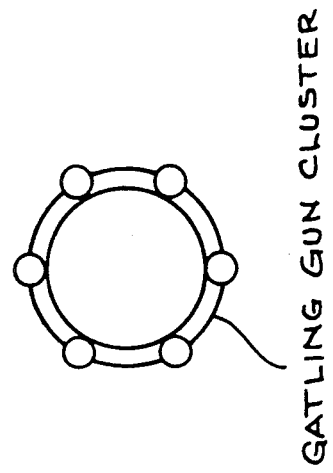
FIGS. 2 and 2A are a schematic plan view of a single ram accelerator for a gatling gun in accordance with an embodiment of the invention.
Figure 2:
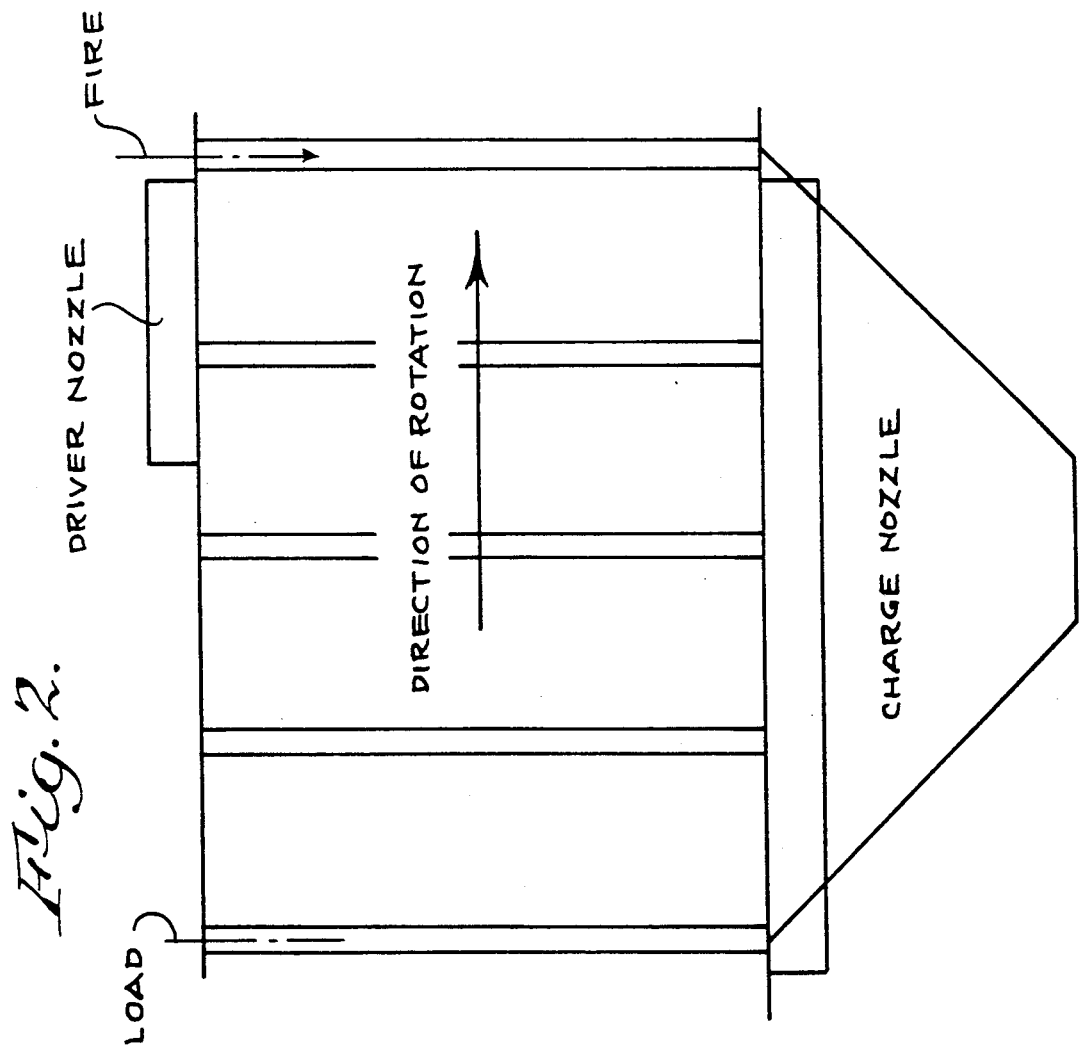

The proposed charging system, which may be herein designated as the "wave charger," consists of a flow system with nozzles for introducing gas into both ends of a barrel as illustrated in FIGS. 1 and 2. The rapid fire concept consists of a conventional fixed barrel or Gatling gun with a gas diversion mechanism followed by the dynamically-charged ram accelerator section.

The wave charger concept uses unsteady flow wave mechanisms to fill the accelerator tube to the desired pressure level rapidly and to provide residual flow to tailor the system performance. Specific benefits that can be attributed to this concept include: (1) an initial flow velocity relative to that of the projectile that can either help start the ram combustion process as the projectile enters the tube or can help reduce the initial projectile Mach number required to start ram acceleration; (2) a velocity gradient within the tube to optimize the projectile Mach number as it travels through the tube and thereby improve performance; (3) the ability to vary the propellant concentration along the tube; (4) the ability to introduce propellant in spray or atomized form; and (5) the ability to cool the accelerator tube between shots by the flow of cool gas.

"Propellant" as used herein means a compound or group of compounds which will decompose or combine to create a pressure behind the projectile. "Compound" as used herein is intended to include individual elements. "Combustion" is broadly used herein to include decomposition reactions to create pressure, e.g., decomposition of atomized or dissolved nitroglycerin. "Gas" as used herein is intended to include atomized liquids as well as true gases.

Figure 3:
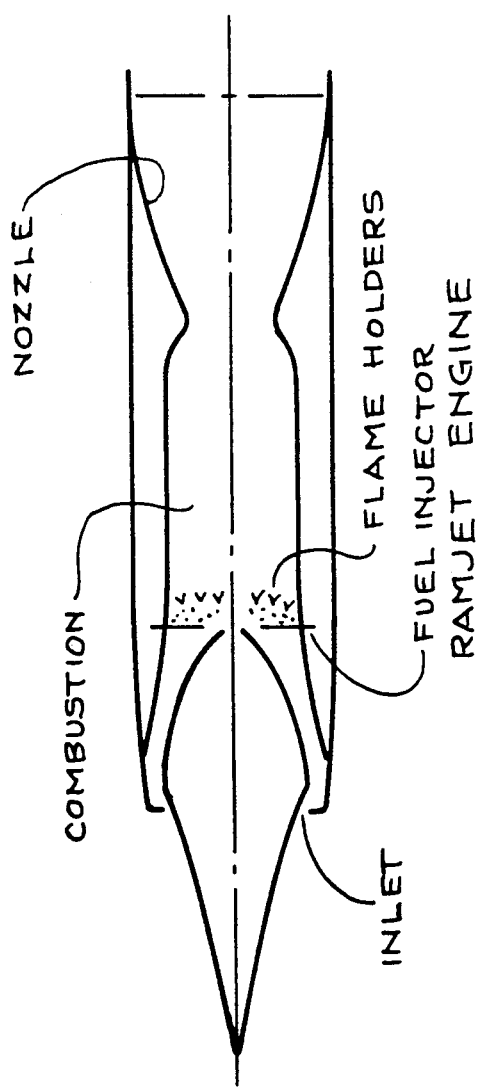
FIG. 3 is a schematic plan view of a ramjet engine.

The ram accelerator, as previously discussed, is a concept for increasing the velocity of a projectile from some initial minimum value to levels ranging from 2 to 10 kilometers per second or more. The concept is based on ramjet principles whereby air, initially at supersonic speeds relative to the engine, enters the ramjet through a diffuser section and is compressed. Fuel is injected and burned in the gas stream to increase the energy and create thrust upon exit. The ramjet diffuser consists of a centerbody that is attached to a cowling with a specially designed supersonic inlet configuration as shown in FIG. 3.

Figure 4:
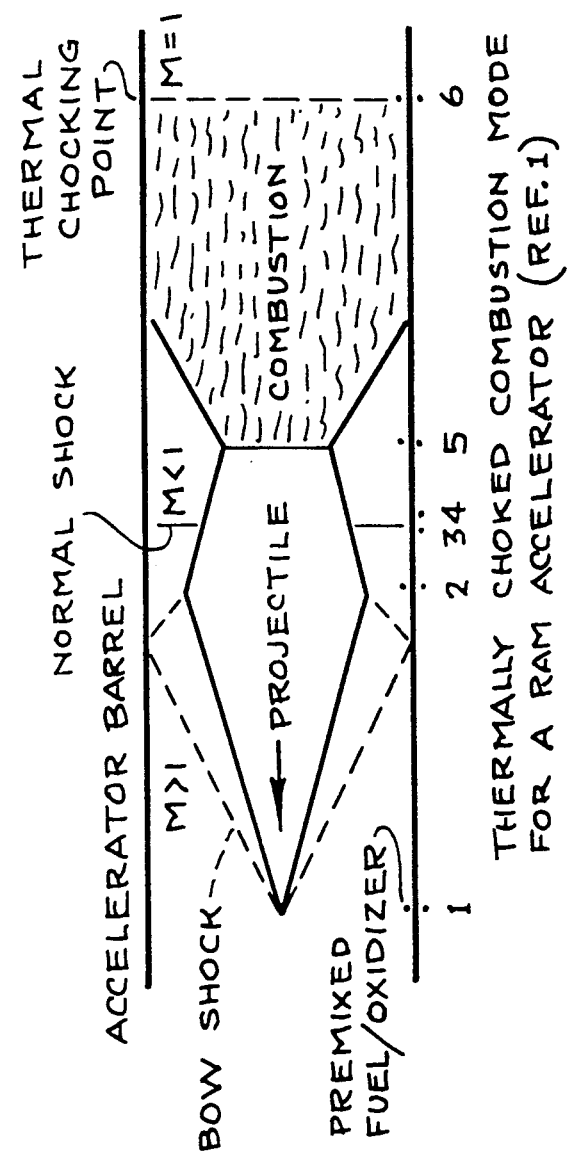
FIG. 4 is a schematic plan view of a thermally choked combustion mode for a ram accelerator.

In the case of the ram accelerator, the centerbody is the projectile which travels through a long straight tube, as shown in FIG. 4, which provides part of the function of the cowling. The projectile contains no fuel, but rather, travels through a preloaded gas that contains a propellant which is usually a mixture of fuel and oxidizer optionally along with a diluent to assist in tailoring the combustion rate and energy levels. The projectile/diffuser must be designed so that choking does not occur at the minimum area region of the diffuser but that a normal shock forms in the region of increasing area as shown in FIG. 4 for an acceptable minimum projectile Mach number. Should choking occur, the normal shock would jump ahead of the projectile, a result of an unstarted diffuser, which would cause the concept not to work. The projectile Mach number, based on the speed of sound of the gas contained in the accelerator tube should be greater than 2.5. The ratio of projectile area at the end of the diffuser to bore area is desirably about 0.58. Taking the ratio of bore area to minimum flow area past the projectile, $A/A_{min} = 2.37$. For a gas with $\gamma = 1.4$, $A/A^* = 2.64$ for a Mach number of 2.5 where $A^*$ is the area at Mach 1. Substituting these conditions into the test conditions described in Hertzberg et al. "The Ram Accelerator: A New Chemical Method for Accelerating Projectiles to Ultrahigh Velocities, AIAA Journal 1988, Hertzberg et al., incorporated herein by reference as background art, it is evident that choking will not occur if the supersonic diffusion process is nearly isentropic. It is important that ignition of the gas mixture does not occur ahead of the minimum flow area region (maximum projectile diameter) or any thrust component would be negated. When the diffuser section operates properly, shock waves are weak and associated increases in temperature are not sufficient to cause ignition. The thermally choked mode of operation, the area in which most experimental research has been conducted to date, requires an igniter to initiate combustion. In addition, flame stability problems that are commonly encountered in ramjet burners, in which a recirculation zone at the base of the projectile may not return sufficient hot gas to properly pilot a flame, may require a flame holder configuration to be incorporated into the projectile design.

Figure 6:
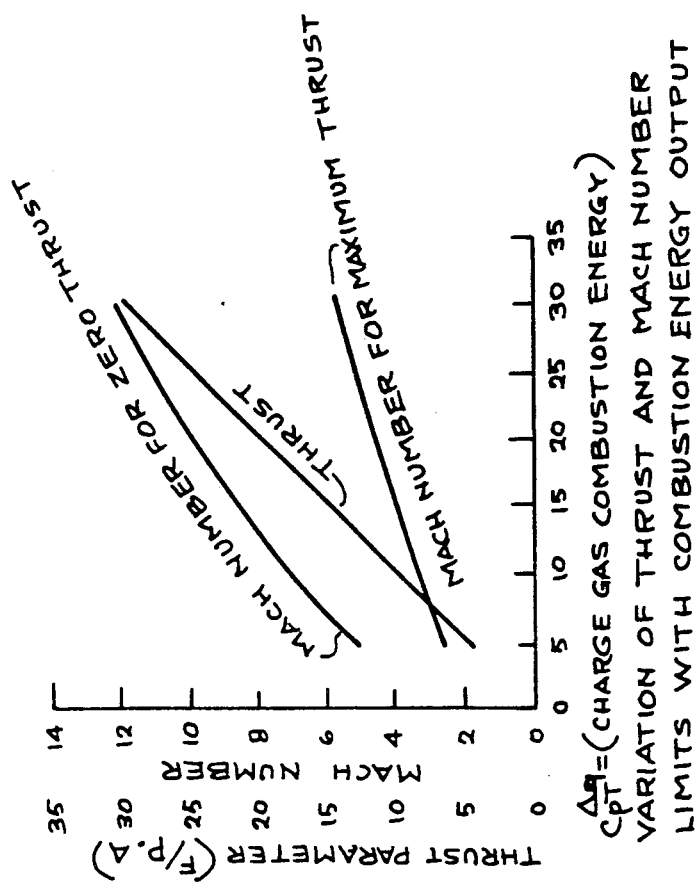
FIG. 6 is a graph showing variation of thrust and Mach number limits with combustion energy output.
Figure 5:
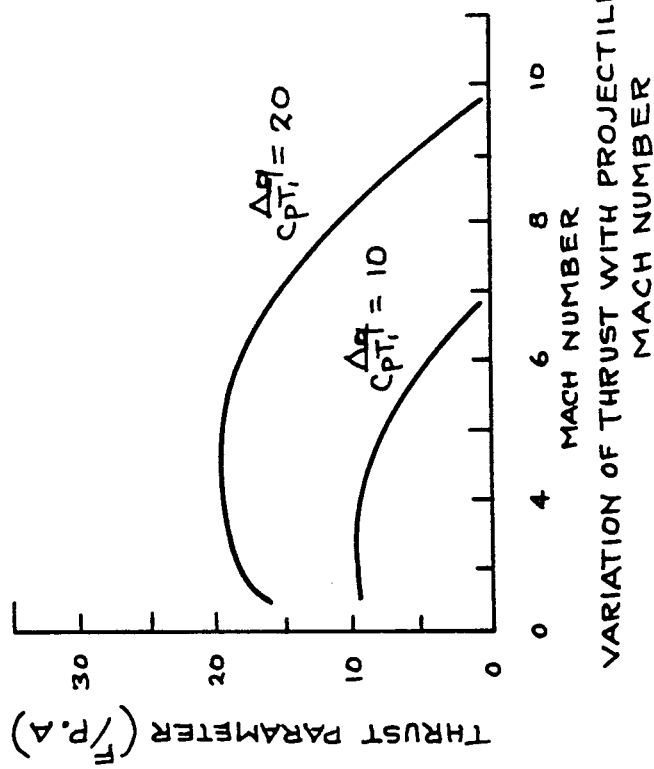
FIG. 5 is a graph showing variation of thrust with projectile Mach number of a ram accelerator in accordance with an embodiment of the invention.

According to a simplified one-dimensional analysis presented by Hertzberg et al. supra, an estimate of ram accelerator performance can be obtained from the following equation:

$$\frac{F}{p_1 A} = \frac{\gamma_1 M_1}{\gamma_6} \left\{ 2 \frac{(\gamma_6^2 - 1)}{\gamma_1 - 1} \left[ 1 + \frac{\gamma_1 - 1}{2} M_1^2 + \frac{\Delta q}{c_{p1} T_1} \right] \right\}^{\frac{1}{2}} - (1 + \gamma_1 M_1^2)$$

where F is the propulsive force $p_1$ is the pressure ahead of the projectile A is the tube cross-sectional area $\gamma_1$, $\gamma_6$ are the rate of specific heats of gas ahead of the projectile and in the combustion region, respectively $M_1$ is the projectile Mach number with respect to the gas into which it travels, $\Delta q$ is the energy released by combustion, and $c_{p1} T_1$ is the static enthalpy of the gas ahead of the projectile It is noted that the propulsive force is directly proportional to the initial pressure within the ram accelerator tube. To estimate the effects of projectile Mach number and combustion energy, it may be assumed that $\gamma_1 = \gamma_6 = 1.4$ and that $c_{p1}$ is equivalent to that of air. The change in propulsive force parameter with Mach number is shown in FIG. 5. The Mach numbers at which maximum and zero force occur in addition to the maximum propulsive force as a function of energy release are shown in FIG. 6. It is noted that peak propulsive force is nearly directly proportional to the combustion energy. In addition, the propulsive force is relatively constant for half of the Mach number range from $M_1 = 2.5$ to the zero-force Mach number. Finally, it is observed that the high performance Mach number range increases with increasing combustion energy.

The relationship indicates that propulsive force is directly proportional to the initial pressure within the Ram Accelerator tube and is a strong function of the gas combustion energy, the Mach number, and the ratio of specific heats of the undisturbed gas and the combustion products. As shown in FIG. 9, the propulsive force for various gas mixtures is relatively constant over the first half of the useful Mach number range and the width of this range also increases with increasing combustion energy. The theoretical force parameter decays to zero at some value of Mach number, which places an upper limit on propulsion for a given gas under thermally choked conditions; however, this probably represents a transition to increased thrust under supersonic conditions.

These observations suggest that high performance (high thrust) objectives require that the accelerator tube be initially charged to a relatively high pressure, the speed of sound be as high as possible while being compatible with the $M_1$ - 2.5 requirement, and as high a value of $\Delta q/c_p T_l$ as possible without creating backflow, be used. It further suggests that progressive increases in speed of sound throughout the tube would provide benefit by keeping the Mach number in the high thrust range relatively low even though the projectile velocity has increased substantially. Finally, initial flow and unsteady flow gradients within the tube could further augment performance by creating favorable changes in the initial gas velocity relative to the projectile.

Heretofore, ram accelerator development has been devoted almost exclusively to the combustion cycle. To implement this unique propulsion concept into a weapon system, the combustion parameters must be duplicated using techniques suitable for rapid sequential fire. It is imperative that the diaphragm of the prior art be eliminated and that the tube be dynamically charged with the desired gas mixture at the proper state and flow conditions. The wave charger concept has the capability of providing the required flow environment in a way that is suitable for rapid fire.

The wave charger concept uses an unsteady gasdynamic cycle, based on shock tube principles, to create the proper flow environment within the accelerator tube. In one embodiment, the concept incorporates a flow nozzle at both ends of the tube. A charge system provides a steady flow of gas to purge the tube of gases left by the previous shot and to establish a specific pressure and flow velocity of a combustible gas mixture. This nozzle can be located at the muzzle end of the tube and may initially use a non-combustible gas for purge purposes with properties to satisfy the gasdynamic cycle requirements followed by a combustible gas. This system can operate continuously for the duration of the firing sequence for both single and multi-barrel Gatling-gun systems.

A second nozzle which may be referred to as a driver gas nozzle forming a part of a driver flow system may be located at the entrance to the accelerator tube. When steady state flow from the charge system has been established in the tube, the driver flow system is activated in a closely timed sequence with respect to projectile launch. The driver system creates a shock wave in the charge gas that travels the length of the tube, establishes the proper static pressure and reverses the flow. The strength of the shock wave determines the pressure level and flow velocity in the same manner as a shock tube. The charge gas is the combustible mixture into which the projectile travels. For a single-barrel system, the driver gas flow should be pulsed for repeated shots. If the driver flow system consisted of the driver nozzle, a small reservoir, and a fast-opening valve, the shock would be strong initially but would decay as the reservoir pressure dropped. This approach would create a favorable flow pattern for the Ram Accelerator.

For a Gatling gun, the charge system would desirably flow continuously for the duration of the burst. The fixed charge and driver nozzles would be exposed to a given tube cyclically as the bundle of tubes rotated. The nozzles would cover an arc of circumference and flow gradients within the accelerator tube could be established by varying charge or driver gas flow along the arc length by means of nozzle geometry.

Figure 10:
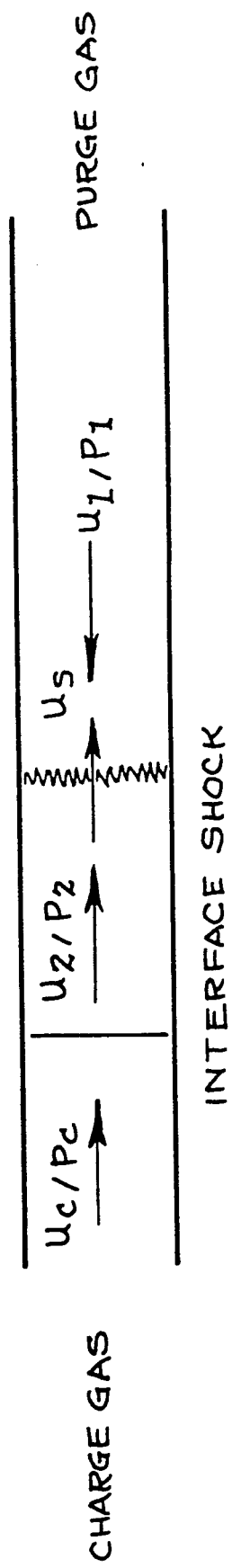
FIG. 10 shows a diagram of a gas dynamic cycle of an embodiment of a ram accelerator of the invention.

The gasdynamic cycle is as illustrated in FIG. 10 for which Governing Equations are as follows:

Continuity  $\rho_1(u_s + u_1) = \rho_2(u_s - u_2)$

Momentum  $p_1 + \rho_1(u_s + u_1)^2 = p_2 + \rho_2(u_s - u_2)^2$

Energy  $h_1 + \dfrac{(u_s + u_1)^2}{2} = h_2 + \dfrac{(u_s - u_2)^2}{2}$

Figure 7:
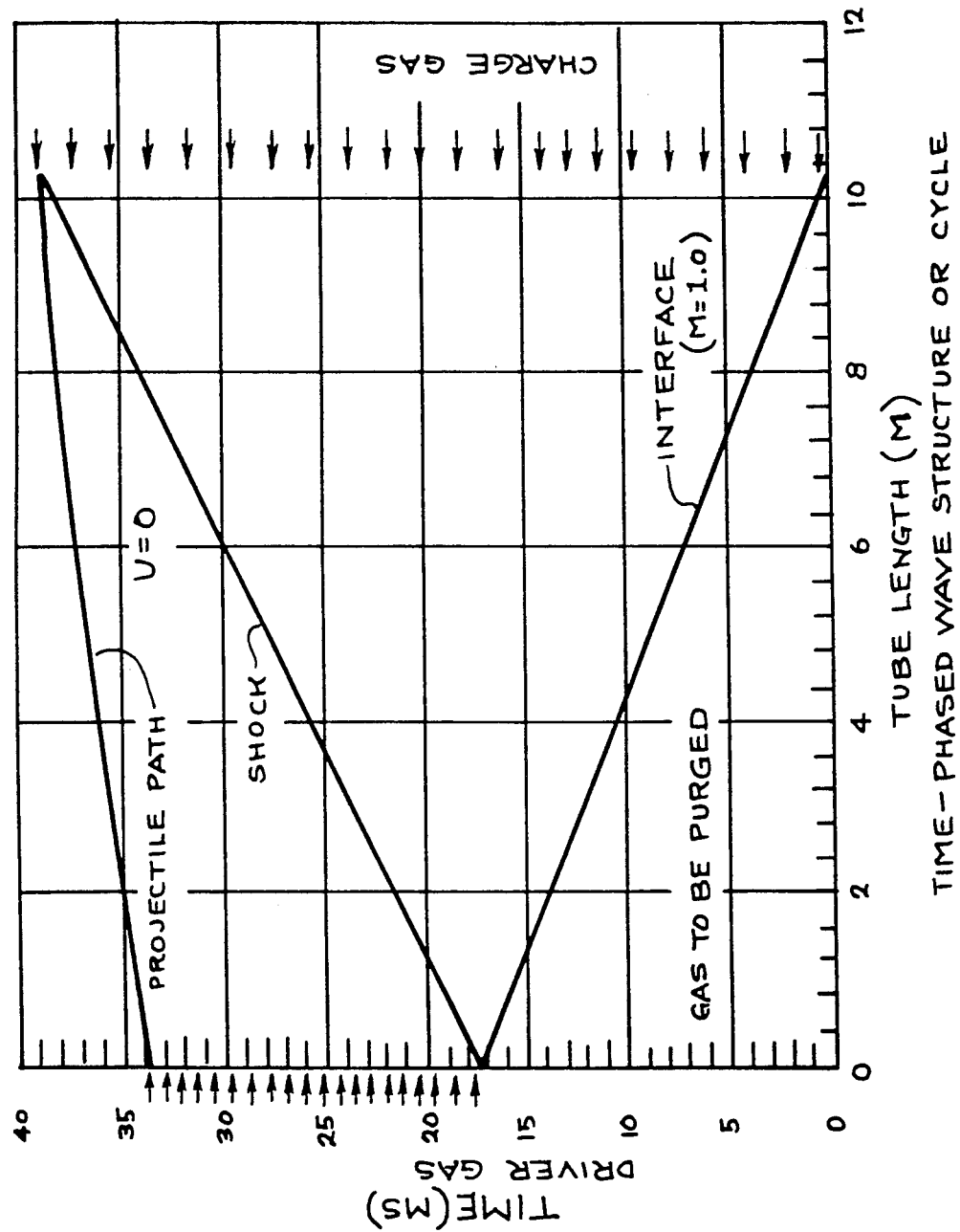
FIG. 7 shows a wave charge cycle diagram.

Pressure and velocity are equal across the interface. The wave diagram for a system as previously described is shown in FIG. 7 wherein charge gas is introduced at T=0 at 10M tube length and driver gas is introduced at T=17 millisecond (ms) and the projectile is introduced at T=34 ms.

Figure 8:
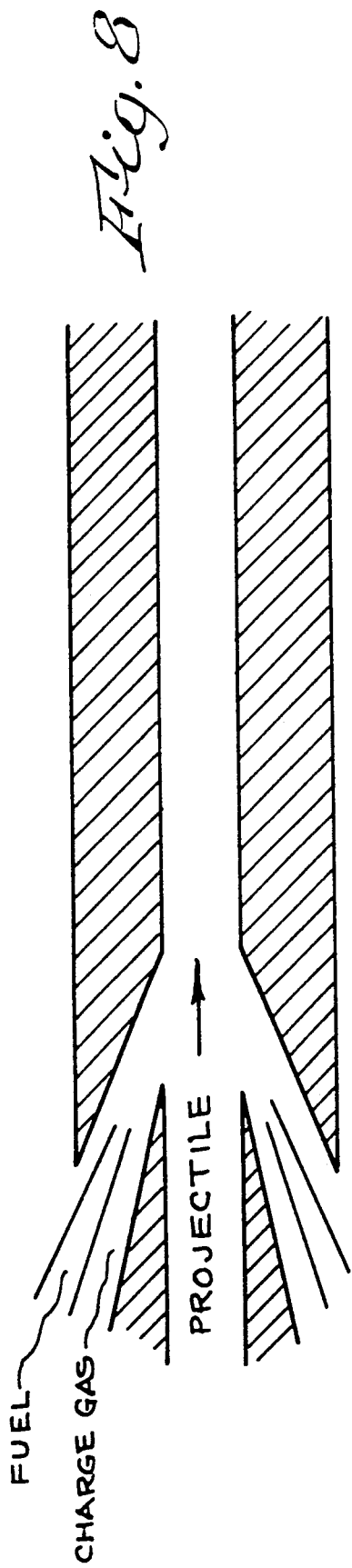
FIG. 8 shows a schematic plan view for charge nozzle concept for a stationary single barrel system.

It is proposed to store the fuel separately from the oxidizer/diluent gas and to generate the final combustible mixture in the injection nozzle. An example of a charge nozzle for a single barrel system is shown in FIG. 8. Note that the nozzle is an annular device that is attached to the accelerator tube so that the projectile travels through the center of the nozzle.

To illustrate the charging cycle, a simple case will be evaluated. It will be assumed that both charge and driver gases are air with a ratio of specific heats of 1.4 with ideal gas behavior. Only the shock, generated by the driver gas and propagating through the charge gas, is considered. The goal is to achieve a static pressure of 20 atm in the accelerator tube and a projectile Mach number no less than 2.5.

Assume that the charge gas flows through the accelerator tube at sonic velocity and a pressure of 5 atm. Thus, $u_1 = 1100$ ft/sec, $p_1 = 5$ atm, $p_2 = 20$ atm and $p_2/p_1 = 4$. The pressure ratio, $p_2/p_1$ is the shock strength that governs the parameters of the gas into which the projectile travels. From this the following parameters can be derived with the aid of the following compressible flow tables.

| | | |
|---|---|---|
| $p_2/p_1$ | shock pressure ratio | = 4 |
| $M_s$ | shock Mach number | = 1.89 |
| $u_s + u_1$ | charge gas velocity relative to shock | = 2079 ft/sec |
| $u_s$ | shock velocity | = 979 ft/sec |
| $u_2, u_c$ | velocity of shocked charge gas and driver gas relative to the tube | = 139 ft/sec |

Thus, a tube 15 feet long can be charged in 0.108 sec using these cycle parameters. To achieve a projectile Mach number of 2.5, the velocity of the projectile relative to the shocked charge gas must be $$u_2 = 2.5 \times 1100 = 2750 \text{ ft/sec}$$

Because the gas is already flowing at a velocity of 139 ft/sec, the projectile velocity must be increased by that amount to $u_p = 2750 + 139 = 2889$ ft/sec.

There are several design features that must be highlighted. In addition to removing residual gases from the tube, the purpose of the charge system is to establish an initially uniform flow of gas at near sonic conditions and at a specified static pressure. The velocity of this gas can be altered by changing the speed of sound as determined by its composition. The desired final charge gas conditions (pressure and velocity) can be achieved by a combination of initial charge gas conditions and shock pressure ratio. A higher shock pressure ratio and lower initial charge gas velocity both tend to increase the final charge gas velocity. The shock pressure ratio is multiplied by the initial charge gas static pressure so that desired final charge gas pressure and velocity can be achieved independently. It is noted that the tube fill time (tube length divided by charge gas velocity) can be reduced if the sound speed of the charge gas is increased or the shock pressure ratio is increased. Of course, for increased charge gas velocities, the projectile velocity must be increased to maintain the required minimum value for projectile Mach number relative to the charge gas. Finally, it is important to note that because the charging cycle is based on an unsteady flow cycle, similar to that in a shock tube, the flow conditions evaluated in the example only exist as long as the shock wave remains in the tube. When the shock wave passes from the tube, an expansion fan is created that propagates into the tube (toward the projectile), decreases the pressure and increases the velocity. Thus, the time that the projectile is fired is critical with respect to the overall cycle design. Ideally, the projectile and the charge/driver gas interface should exit from the acceleration tube simultaneously. However, the unsteady nature of the flow creates opportunities for "timing" the occurrence of expansion waves to tailor the flow in a way that will maximize performance.

Other beneficial features include the possibility for introducing fuel into an initially non-combustible charge gas and the tube wall cooling effects of the charge gas. Because it is proposed to inject the fuel into the charge gas with a separate flow system, the fuel flow rate can be varied with time which will provide a tailored concentration gradient along the tube. If the fuel should be in liquid form, the fuel nozzle and charge flow system can be designed so that liquid breakup and mixing in the charge gas flow is suitable for ultimate combustion. The charge gas is initially at room temperature or lower. While it is in the process of establishing the uniform flow required for the wave cycle to function properly, the flow effectively removes heat deposited in the tube wall from the previous shot.

The basic principle of the wave charger concept is illustrated by the forgoing embodiment. It is to be understood that many other embodiments are possible. For example, a combustion gas mixture may be introduced into both ends of the tube to force gas in the tube through a centrally located valve thus purging the tube. Upon rapid closing of the valve, shock waves are created which move toward the ends of the tube creating elevated pressure static conditions within the tube. There may also be multiple points of introduction of combustible gas and multiple exits to tailor pressures and compositions through which the projectile passes.

There are several wave cycles that are of particular interest for charging the ram accelerator. The basic cycle described previously incorporates a charge nozzle at the muzzle end of the tube and a driver nozzle at the tube entrance. A cycle can be devised that reverses the nozzle locations. Multiple driver nozzles located at both ends can be used to establish complex wave patterns and expansion waves can also be introduced at either end to create flow gradients that can be used to tailor the combustion process.

What is claimed is:

1. In a ram accelerator for a projectile comprising:
   a tube having an inlet end for accepting the projectile and a muzzle end from which the projectile may leave the tube;
   means for charging the tube with a combustible gas mixture at an initial elevated pressure in the absence of combustion so that the projectile may be accelerated by combustion of the mixture behind the projectile as it passes through the tube from the inlet end to the muzzle end; and
   means for igniting the gas behind the projectile; the improvement which comprises a means to create the elevated pressure, which includes a means for forming at least one shock wave within the combustible gas mixture, to obtain said elevated pressure before the projectile passes through the gas.

2. The ram accelerator of claim 1 wherein the means for creating the elevated pressure creates a static elevated pressure.

3. In a ram accelerator for a projectile comprising a tube having an inlet end and a muzzle end, and means for charging the tube with a combustible gas mixture at an initial elevated static pressure in the absence of combustion so that a projectile may be accelerated by combustion of the mixture behind the projectile as it passes through the tube, the improvement utilizing a charging means which comprises means for charging the tube with a gas mixture at at least one charging location along said tube and means for introducing gas at an elevated pressure at at least one introducing location along said tube, thus creating at least one shock wave that travels from the introducing location throughout the tube to establish a desired elevated static pressure.

4. The ram accelerator of claim 3 wherein the means for charging the tube charges the tube with a combustible gas at the muzzle end and charges a second gas at elevated pressure at the inlet end such that a shock wave travels the length of the tube from the inlet end to the muzzle end.

5. The ram accelerator of claim 3 wherein the pressure at the introducing location may be varied to create a sequence of compression and expansion waves that travel throughout the tube to achieve an optimized distribution of pressure and gas velocity within the tube.

6. The ram accelerator of claim 5 wherein the means for charging the tube charges the tube with the combustible gas at the muzzle end and gas, at first increasing and then decreasing pressure, is introduced at the inlet end to create a series of compression waves followed by a series of expansion waves that travel the length of the tube from the inlet end to the muzzle end, thereby, creating a gas velocity distribution such that flow is directed toward both ends of the tube while being stationary at some location near the center.

7. In a method for ram accelerating a projectile which comprises:

charging a tube, having an inlet end for accepting the projectile and a muzzle end from which the projectile may leave the tube, with a combustible gas mixture at an initial elevated pressure, in the absence of combustion, so that the projectile may be accelerated by combustion of the mixture behind the projectile as it passes through the tube from the inlet end to the muzzle end;

introducing the projectile into the inlet end; and igniting the combustible gas mixture between the projectile and the inlet end; the improvement which comprises creating the elevated pressure within the tube by means of a shock wave within the combustible gas mixture to obtain the elevated pressure before the projectile passes through the gas.

8. The method of claim 7 wherein a static elevated gas pressure is created.